United States Patent
Naka et al.

(10) Patent No.: US 8,279,357 B2
(45) Date of Patent: Oct. 2, 2012

(54) SYSTEM AND METHODS FOR TELEVISION WITH INTEGRATED SOUND PROJECTION SYSTEM

(75) Inventors: Masafumi Naka, Irvine, CA (US); Peter Mortensen, Lake Elsinore, CA (US)

(73) Assignee: Mitsubishi Electric Visual Solutions America, Inc., Irvine, CA (US)

( * ) Notice: Subject to any disclaimer, the term of this patent is extended or adjusted under 35 U.S.C. 154(b) by 514 days.

(21) Appl. No.: 12/544,432

(22) Filed: Aug. 20, 2009

(65) Prior Publication Data

US 2010/0053466 A1 Mar. 4, 2010

Related U.S. Application Data

(60) Provisional application No. 61/093,459, filed on Sep. 2, 2008.

(51) Int. Cl.
*H04N 5/50* (2006.01)
*H04N 5/60* (2006.01)
*H04R 5/02* (2006.01)

(52) U.S. Cl. ......... 348/738; 348/569; 381/303; 381/307

(58) Field of Classification Search .................. 348/738, 348/569; 381/61, 300, 303, 307; 345/440, 345/440.1
See application file for complete search history.

(56) References Cited

U.S. PATENT DOCUMENTS

| | | | |
|---|---|---|---|
| 4,697,778 A | 10/1987 | Harashima | |
| 4,933,768 A * | 6/1990 | Ishikawa et al. | 348/738 |
| 5,749,304 A | 5/1998 | Turner | |
| 5,812,688 A * | 9/1998 | Gibson | 381/119 |
| 6,104,443 A | 8/2000 | Adcock et al. | |
| 6,349,657 B1 | 2/2002 | Wohlford | |
| 6,530,550 B1 | 3/2003 | Knighton et al. | |
| 6,640,337 B1 * | 10/2003 | Lu | 725/39 |
| 6,977,653 B1 * | 12/2005 | Cleary et al. | 345/440 |
| 7,305,097 B2 * | 12/2007 | Rosen et al. | 381/307 |
| 7,384,021 B2 * | 6/2008 | Liao | 248/415 |
| 7,501,994 B2 | 3/2009 | Sato et al. | |
| 7,602,924 B2 * | 10/2009 | Kleen | 381/61 |
| 2002/0171624 A1 | 11/2002 | Stecyk et al. | |
| 2004/0013271 A1 * | 1/2004 | Moorthy | 381/1 |
| 2004/0151325 A1 | 8/2004 | Hooley et al. | |
| 2004/0252187 A1 | 12/2004 | Alden | |
| 2005/0152557 A1 * | 7/2005 | Sasaki et al. | 381/58 |
| 2005/0179618 A1 | 8/2005 | Oh | |
| 2006/0071141 A1 | 4/2006 | Kang | |
| 2006/0125968 A1 * | 6/2006 | Yokozawa et al. | 348/734 |
| 2006/0126878 A1 | 6/2006 | Takumai et al. | |
| 2006/0140420 A1 | 6/2006 | Macheda | |
| 2006/0192901 A1 | 8/2006 | Hurd | |
| 2006/0204022 A1 | 9/2006 | Hooley et al. | |

(Continued)

FOREIGN PATENT DOCUMENTS

EP  1921890 A2  5/2008

(Continued)

*Primary Examiner* — Victor Kostak
(74) *Attorney, Agent, or Firm* — Dickstein Shapiro LLP; Kenneth S. Roberts

(57) ABSTRACT

Systems and methods that facilitate the use and operation of a television with an integrated sound projection system. The sound projector preferably comprises an array of speakers configurable to project beams that reflect off the walls and ceiling to create surround sound. In one embodiment, sound can be projected and/or the television can be oriented automatically as a function of the location of the television remote control unit.

18 Claims, 15 Drawing Sheets

U.S. PATENT DOCUMENTS

| | | |
|---|---|---|
| 2006/0232552 A1 | 10/2006 | Chung |
| 2006/0238661 A1 | 10/2006 | Oh |
| 2007/0019831 A1 | 1/2007 | Usui |
| 2007/0097024 A1 | 5/2007 | Jung et al. |
| 2007/0144410 A1 | 6/2007 | Todorovic |
| 2007/0153122 A1 | 7/2007 | Ayite et al. |
| 2007/0216805 A1 | 9/2007 | Yamamoto et al. |
| 2007/0266412 A1 | 11/2007 | Trowbridge et al. |
| 2007/0296818 A1 | 12/2007 | Pouval |
| 2008/0165176 A1 | 7/2008 | Archer et al. |
| 2008/0278635 A1* | 11/2008 | Hardacker et al. ............ 348/734 |
| 2009/0010455 A1 | 1/2009 | Suzuki et al. |
| 2009/0034762 A1 | 2/2009 | Konagai et al. |
| 2009/0060237 A1 | 3/2009 | Konagai et al. |
| 2009/0290064 A1* | 11/2009 | Matsumoto et al. .......... 348/515 |
| 2009/0316938 A1* | 12/2009 | Matsumoto ................... 381/300 |

FOREIGN PATENT DOCUMENTS

| | | |
|---|---|---|
| JP | 2007-295425 A | 11/2007 |
| JP | 2007300404 A | 11/2007 |
| WO | WO 02/078388 A2 | 10/2002 |
| WO | WO 2005/086526 A1 | 9/2005 |
| WO | WO 2007/007083 A1 | 1/2007 |

* cited by examiner

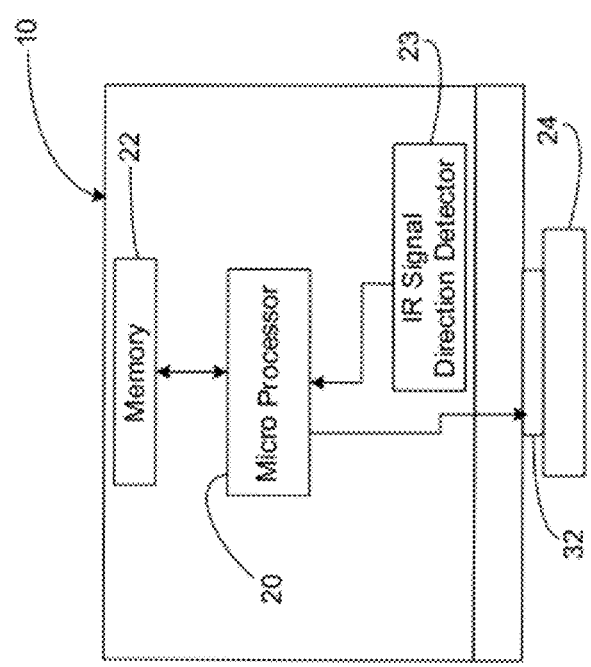
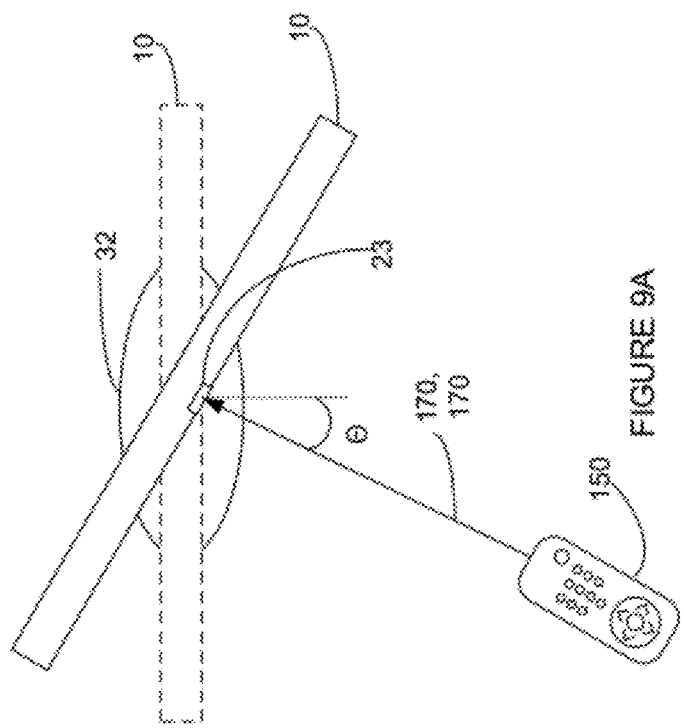
FIGURE 9B
FIGURE 9A

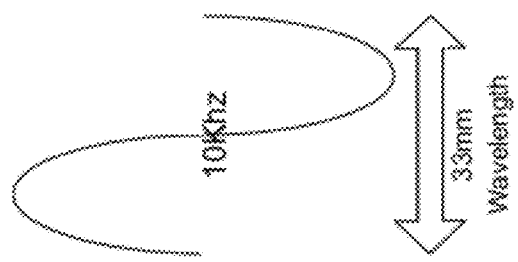
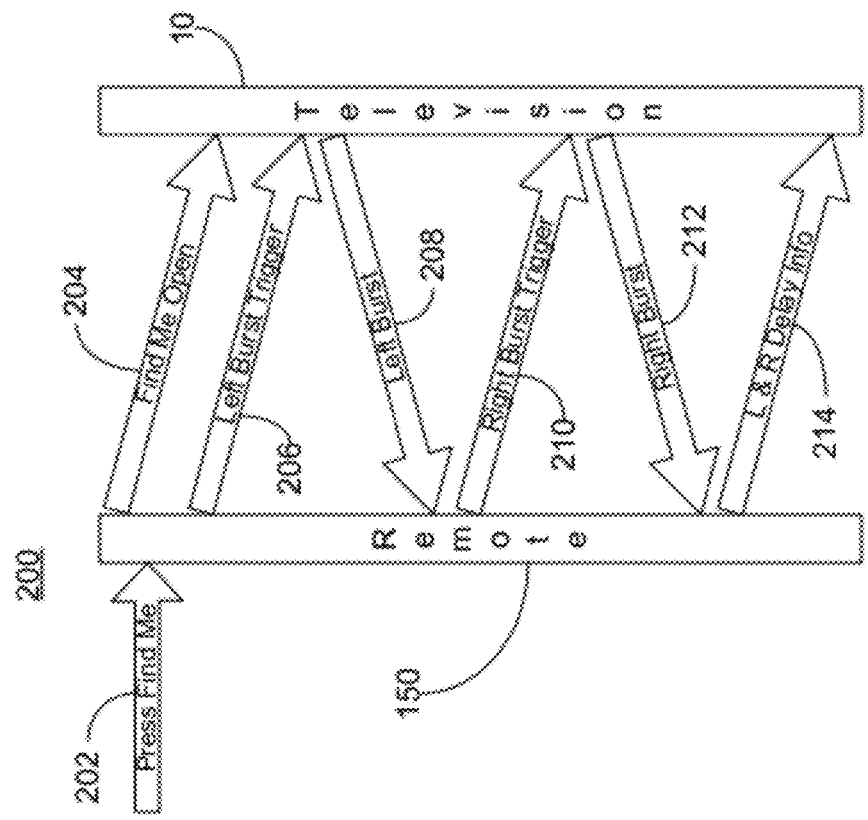

SYSTEM AND METHODS FOR TELEVISION WITH INTEGRATED SOUND PROJECTION SYSTEM

CROSS-REFERENCE TO RELATED APPLICATION

This application claims the benefit of provisional application Ser. No. 61/093,459 filed Sep. 2, 2008, which is fully incorporated herein by reference.

FIELD OF THE INVENTION

The invention relates generally to televisions and sound projection systems and more particularly to systems and methods that facilitate use and operation of a television with an integrated sound projection system.

BACKGROUND INFORMATION

As the capabilities of the TV and other components increase and become more affordable, more and more consumers will seek a true surround sound. Surround sound generally refers to the application of multi-channel audio to channels "surrounding" the audience in some combination of left surround, right surround, and rear surround as opposed to "screen channels" such as center, front left, and front right. In 4.0 channel or higher surround, the system will typically include a center channel speaker, a left front channel speaker and a right front channel speaker, two or more surround channel speakers in the rear or rear and side, and a low frequency effect channel to drive a subwoofer. For example, in 5.1 channel surround, the system typically includes a center channel speaker, a left front channel speaker and a right front channel speaker, two surround channel speakers in the left rear and right rear, and a low frequency effect channel to drive a subwoofer.

Currently, a consumer needs a high end audio-video receiver (AVR) in order to drive the sound system speakers. The AVR includes a decoder that will, depending on the audio source, extract from the audio signal a number of channels corresponding to the number of available speakers or deliver a discrete number of audio channels corresponding to the available speakers. For example, in a 5.1 channel surround system, the decoder will, depending on the audio source, extract five audio channels and one LFE channel from either a specially encoded two-channel source or a stereo source and distribute to the five speakers and one sub-woofer or deliver five discrete audio channels and one LFE channel from a 6 channel source to the five speakers and one sub-woofer. However, for the consumer, the addition of an AVR component and multiple speakers adds another level of complexity to their home entertainment system, the control of which can often be fraught with frustration.

Recent advances in sound projection technology from 1 LTD of Cambridge, England, eliminates the need for an AVR component and multiple speakers positioned around the room and wire coupled or wireless coupled to the AVR. In accordance with 1 LTD's sound projection technology, beams of sound emanate from an array of speakers mounted in a single enclosure, i.e., a sound projector, into the room in which the sound projector is positioned and reflect off the walls and ceiling of the room creating surround sound within the room. In addition, the sound projector is capable of beaming one or more beams of sound to targeted locations within the room. See, e.g., EP1921890A2, US2006/0204022A2, WO02/078388A2, WO2007/007083A1 and US2004/0151325A1, which are incorporated herein by reference.

Currently, the sound projector is a stand alone component separate from the TV, with microprocessor control, and controllable by the user with a custom universal remote control unit with additional processor capabilities. Accordingly, it would be desirable to provide a TV with an integrated sound projection system that is controlled by the TV microprocessor control system and controllable and configurable by the user with a TV remote control unit on the TV layer of the remote control unit.

SUMMARY

The embodiments provided herein are directed to systems and methods that facilitate the use and operation of a television with an integrated sound projection system. In one embodiment, a television includes an integral sound projection system incorporating an array of speakers operable to create surround sound within a room and project one or more sound beams to targeted locations. The television preferably comprises audio and video input connections and audio-video outputs such as a sound projector and a video display screen coupled to a control system. The control system includes a micro processor and non-volatile memory upon which system control software is stored, an on screen display (OSD) controller coupled to the micro processor and the video signal input connections, an image display engine coupled to the OSD controller and the display screen. The control system further comprises an audio processor such as a digital sound processor coupled to the micro processor and the sound projector. The audio input connections preferably include conventional audio input connections. The sound projector preferably comprises an array of speakers configurable to inject beams of sound into a room in which the TV is located, which reflect off the walls and ceiling to create surround sound, and configurable to inject one or more targeted beams of sound into the room.

In operation, the user using the menu system and graphical user interface displayable on the screen of the TV and generated by the control system software, can select between different modes of operation including stereo, surround, mono targeted, dual targeted and the like, configure the sound projection system for the user viewing room and component configuration, and automatically calibrate or customize the sound beam parameters of the sound projection system using a microphone couplable to the control system or manually adjust the sound beam parameters by navigating the graphical user interfaced based menu system. Once the room, component and sound beam parameters are entered, the control system will draw graphical representations of the sound beams and display the graphical representations of the sound beams within a graphical representation of the user's viewing room on the TV screen. The user can further use the graphical user interfaced menu system to move the sound beams around the viewing room while being presented with a graphical representation of the same.

In another embodiment, the orientation of the television screen and/or the direction of the sound projection is adjusted as a function of the location of the remote control unit. The location of the remote control unit can be detected by detecting the direction of the IR signal being received by a remote signal direction detector system in the television. Alternatively, the television remote control unit can be equipped with an embedded microphone used to measure the distance between the remote control unit and the right and left speakers of the television. Once the location of the remote control unit or its angular orientation relative to the television is determined, this information can be used to adjust the angular orientation of the screen and/or adjust the location to which sound is projected.

The remote control unit preferably includes a dedicate function key to initiate the process for locating the remote control unit.

The television is preferably equipped with a motorized based to allow rotation of the television. Alternatively, the television could be coupled to a motorized articulating arm.

Other systems, methods, features and advantages of the invention will be or will become apparent to one with skill in the art upon examination of the following figures and detailed description.

BRIEF DESCRIPTION OF THE FIGURES

The details of the invention, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

FIG. 9A depicts a schematic of a television being rotatable toward the remote control unit.

FIG. 9B depicts a schematic of a television with a control system including an IR signal direction detector circuit, and a motorized base capable of orienting the television screen toward the remote control unit.

FIG. 12 depicts a process used to determine the distance the remote control unit is from left and right speakers.

FIG. 13 depicts a graphical representation showing the frequency and wavelength of the right and left sound bursts.

DETAILED DESCRIPTION

The systems and methods described herein are directed to a television with an integrated sound projection system and the control and operation of the television and integrated sound projection system. More particularly, in one embodiment the television includes an integral sound projector comprising an array of speakers operable to create surround sound within a room and project one or more beams to targeted locations. The array of speakers is configurable to inject beams of sound into a room in which the TV is located, which reflect off the walls and ceiling of the room to create surround sound. The array of speakers is also configurable to inject one or more beams of sound into the room and target the one or more beams to desired locations within the room. A detailed description of stand alone sound projectors and sound projection systems that are external to the TV, i.e., not integrally located within the TV, and couplable to a TV and the operation of such sound projectors and sound projector systems are described in EP1921890A2, US2006/0204022A2, WO02/078388A2, WO2007/007083A1 and US2004/0151325A1, which are incorporated herein by reference.

Figure 1:
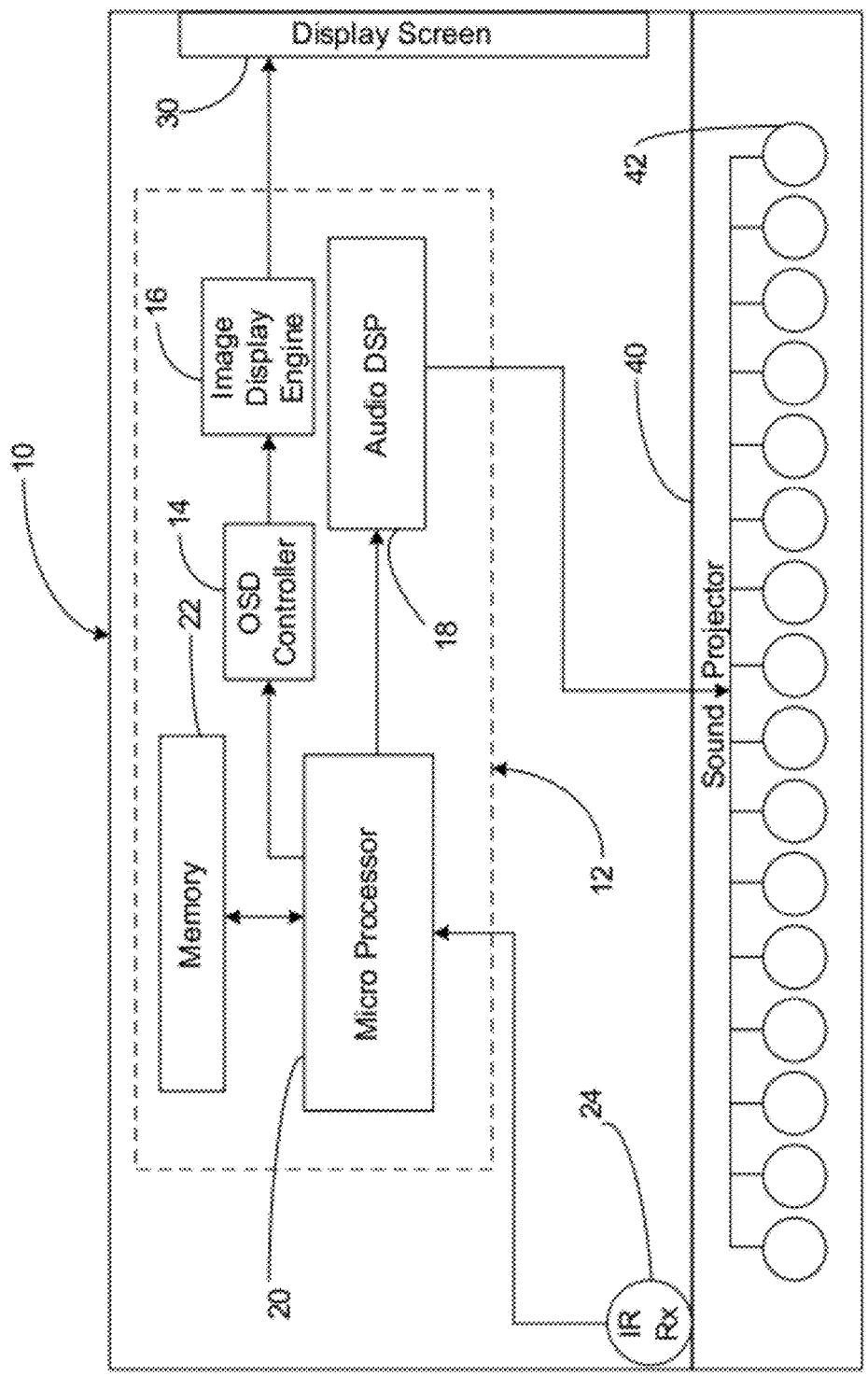
FIG. 1 depicts a schematic of a television with an integrated sound projector and control system.

Turning in detail to the figures, FIG. 1 depicts a schematic of an embodiment of a television 10 with an integral sound projector 40 comprising an array of speakers 42. As shown in FIG. 1, the television 10 preferably comprises a video display screen 30, an IR signal receiver 24 and the sound projector 40 coupled to a control system 12. The control system 12 preferably includes a micro processor 20 and non-volatile memory 22 upon which system software is stored, an on screen display (OSD) controller 14 coupled to the micro processor 20 and an image display engine 16 coupled to the OSD controller 14 and the display screen 30. The control system 12 further comprises an audio processor 18, such as an audio digital sound processor (DSP) or the like, coupled to the micro processor 20 and the sound projector 40.

The system software preferably comprises a set of instructions that are executable on the micro processor 20 and/or the audio processor 18 to enable the setup, operation and control of the television 10 including the setup, operation and control of the sound projector 40. The system software provides a menu-based control system that is navigatable by the user through a graphical user interface displayed or presented to the user on the TV display 30. While on the TV layer of the TV remote control unit, the user can navigate the graphical user interface to setup, operate and control the TV 10, its integral sound projector, and external A-V input devices, such as, e.g., a DVD, a VCR, a cable box, and the like, coupled to the TV 10. A detailed discussion of a graphical user interface-based menu control system and its operation is provided in U.S. Published Patent Application No. US 2002-0171624 A1, which is incorporated herein by reference.

In operation, the user using the menu system and graphical user interface displayable on the screen 30 of the TV 10 and generated by the system software executed on the micro processor 20, can select between different modes of audio operation including stereo, surround sound, targeted single or mono sound beam, targeted dual sound beams and the like. Using the graphical user interface based menu system, the user can also configure the sound projection system in accordance with the user's viewing room parameters such as room dimensions, TV location, distance of couch or main seating area from the TV. Once the sound projection system is configured in accordance with the user's viewing room parameters, the user can select to automatically calibrate the sound beam levels using a microphone couplable to the control system. Alternatively, the user can navigate the graphical user interface based menu system to adjust the sound beam parameters such as sound beam levels and angels. Once the viewing room and sound beam parameters are entered or received by the control system, the control system will draw graphical representations of the sound beams and display the graphical representations of the sound beams within a graphical representation of the user's viewing room on the TV display screen 30. The user can further use the graphical user interfaced menu system to adjust the angles of the sound beams and move the sound beams around the viewing room while being presented with a graphical representation of the same.

Figure 2:
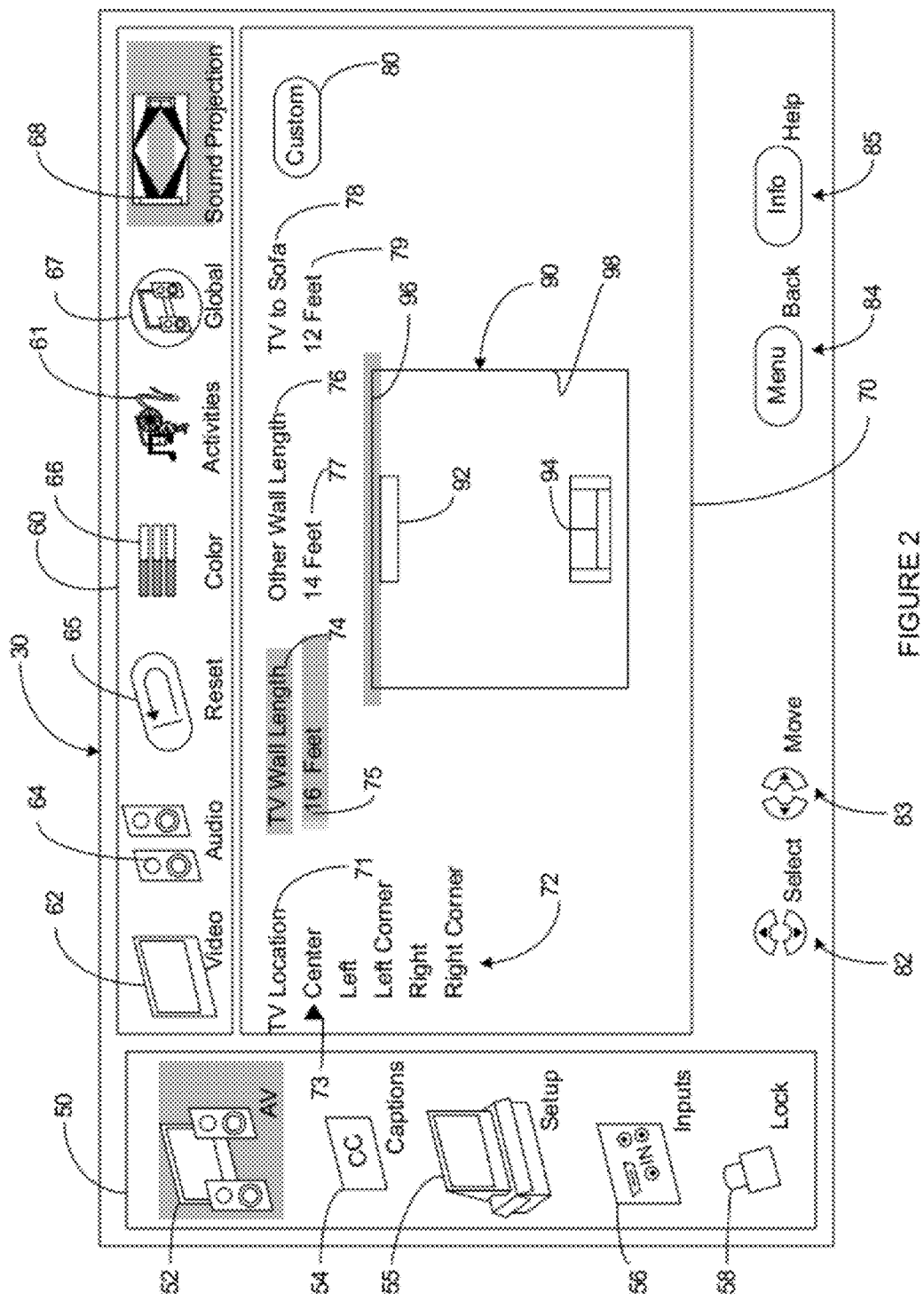
FIG. 2 depicts a graphical user interfaced based menu displayed on the screen of the television with the sound projector configuration menu displayed.

Turning to FIG. 2, configuring the sound projection system using the TV's graphical user interfaced-based multi-layer menu system will be discussed. Upon pressing the menu key on a control panel on the TV 10 or on a remote control unit, the user is presented with a system configuration menu 50 preferably along the left side of the screen 30. The configuration menu 50 preferably comprises selectable graphical icons representing menu options corresponding to functions and/or devices the user can configure such as, e.g., AV devices 50, captions 54, "out of the box" system setup 55, input devices 56 and security systems 58. The user is also presented with a navigation key or guide indicating which keys to press on the remote control to accomplish navigation functions such as "select" 82, "move" 83, "back" 84 and "help" 85. Highlighting, as depicted using gray shading about the icon for the AV device 52 menu option, is used to indicate location within a menu and selected menu item.

Upon selecting the AV device 52 menu option in the system configuration menu 50, a device configuration menu 60 is preferably displayed along the top of the screen 30. The device configuration menu 60 preferably includes selectable graphical icons representing menu option corresponding to functions or devices such as, e.g., video 62, audio 64, reset 65, picture color 66, internet 67, sound projection 68 and the like.

Upon selecting the sound projection 68 menu option in the device configuration menu 60, a sound projection system configuration menu 70 is displayed in the central portion of the screen 30. The sound projection system configuration menu 70 includes an image 90 comprising a graphical representation of the user's TV viewing room, and list of the viewing room parameters such as, e.g., TV location 71, TV wall length 74, other wall length 76 and distance from the TV to a sofa or primary seating area 78, which are needed by the system software to configure the projection sound system to inject sound beams into the viewing room and reflect the sound beams off the walls and ceiling to create surround sound. As depicted in the image of the viewing room 90, the TV wall length parameter 74 refers to the length of a wall in the user's TV viewing room corresponding to the wall 96 that the TV 92 is depicted as positioned on, the other wall length parameter 76 refers to the length of a wall in the user's TV viewing room corresponding to the wall 98 that the TV 92 is not depicted as positioned on, and the TV to sofa parameter 78 refers to the distance between a TV and a sofa or primary viewing area in the user's TV viewing room corresponding to the TV 92 and sofa 94 as depicted in the image of the viewing room 90.

As the selector indicator arrow 73 is moved from one TV location option 72 to another, the TV 92 is preferably depicted at the selected position 72 along wall 96 in the image of the viewing room 90. The user can navigate between the viewing room parameters and enter parameter values 75, 77 and 79.

With the room parameters entered by the user and received by the control system 12, the system software calculates the beam angles for five surround sound beams such as, e.g., front right, front left, center, rear right and rear left beams, to emanate from the speaker array 42 of the sound projector 40 and orients or configures the individual speakers of the speaker array 42 accordingly.

By selecting the soft key 80 labeled "custom" in the sound projection configuration menu 70, the user is presented with graphical traces 140 of the paths the sound beams will follow or follow in the TV viewing room. The traces 140 corresponding to, e.g., a front left sound beam 141, a front right sound beam 142, a center sound beam 146, a rear left sound beam 143, and a rear right sound beam 144 of surround sound, are displayed on the screen 30 in an graphical image 130 representing the TV viewing room with a front or TV wall 133, a back wall 136, side walls 134 and 135, a TV 132 positioned along the TV wall 133 and a couch 138 positioned within the image 130 of the TV viewing room in spaced relation with the TV 132.

As one skilled in the art would readily understand, audio sound beams reflect off the walls of the TV viewing room following the general law of reflection in physics of "angle of incidence equals angle of reflection". The function within the system software that draws the traces 140 includes a loop that draws each segment of a sound beam as a polygon. The corner points of the polygon are calculated through a "point bounce" function that finds the points where a straight line will bounce when shooting the line from a particular point in at a particular angle in a room of particular dimensions, and then uses the law of reflection to return the bounce angles on the room walls. Each side of the beam is calculated separately, but when drawn on the screen the two side lines of a beam represents four end points of a beam polygon.

Representative software code corresponding to the "point bounce" function preferably includes:

```
while (drawing beam segments)
{
    If (beam segment starts above sofa)
    {
        If (beam segment hits sofa)
        {
            Draw polygon of beam to stop at sofa level (from top);
        }
        else
        {
            Draw polygon of beam to hit next bounce points on wall.
            If (beam hits corner of room)
            {
                Terminate further beam drawing, illegal reflection;
            }
        }
    }
    else //beam segment starts below sofa
    {
        If (beam segment hits sofa)
```

```
        {
            Draw polygon of beam to stop at sofa level (from bottom);
        }
        else
        {
            Draw polygon of beam to hit next bounce points on wall;
        }
    }
    Beginning of next beam segment is set equal to end of previous beam
    segment;
}
The "sofa level" is the horizontal line of where the sofa is.
```

Figure 3:
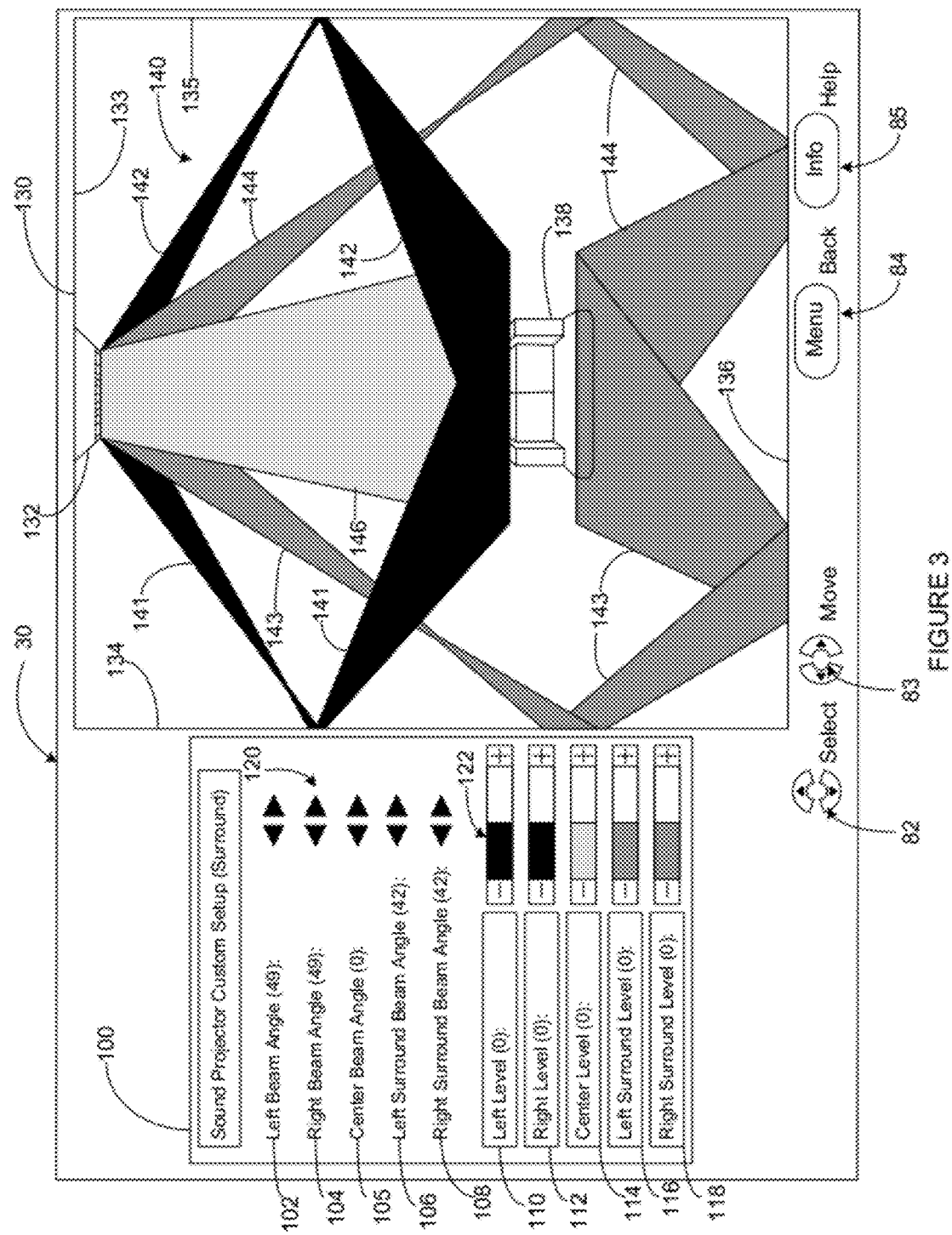
FIG. 3 depicts a graphical user interfaced based menu displayed on the screen of the television with the sound projector surround mode custom setup menu displayed with a graphical tracing of the paths of the sound beams displayed.
Figure 3A:
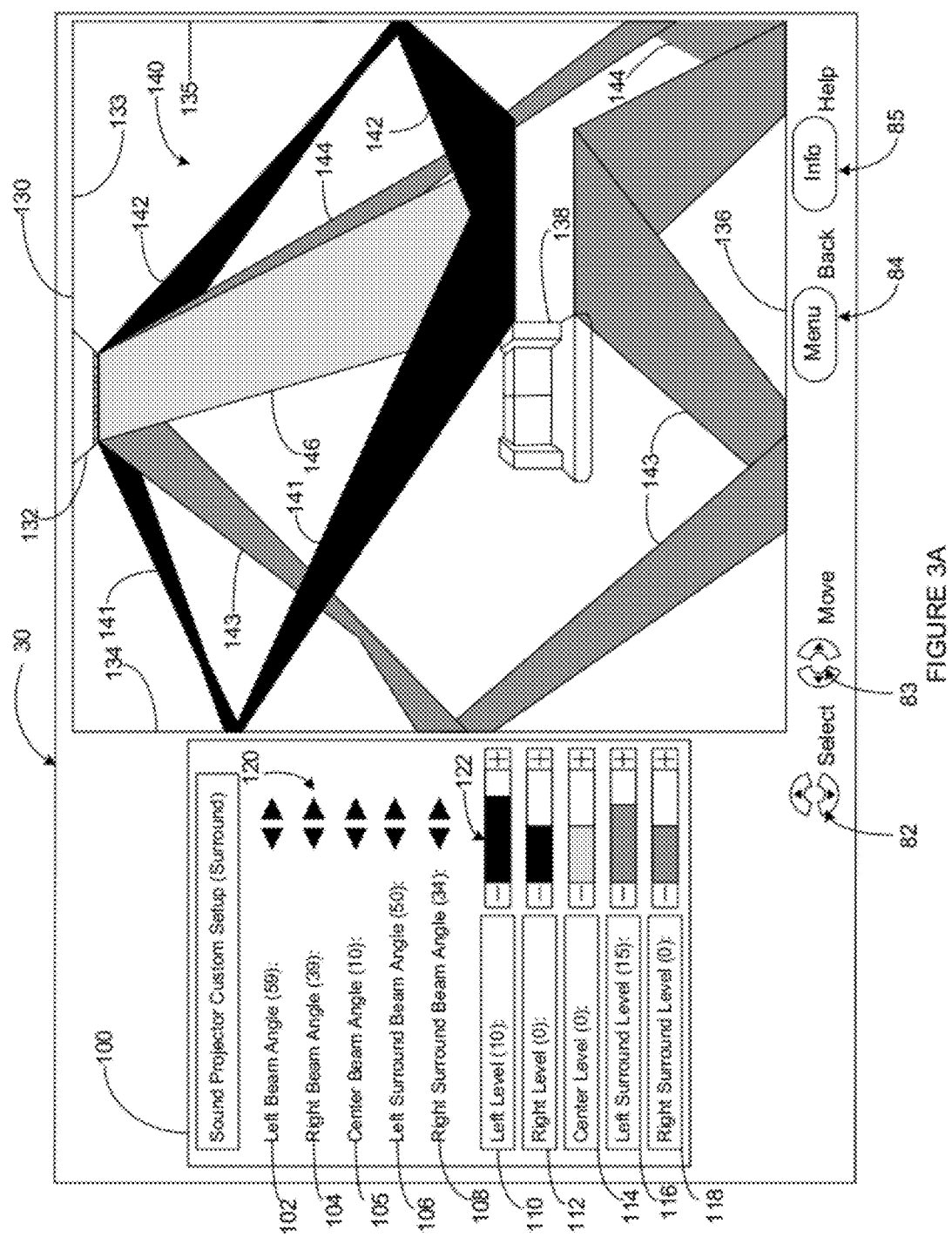
FIG. 3A depicts a graphical user interfaced based menu displayed on the screen of the television with the sound projector surround mode custom setup menu displayed with a graphical tracing of the paths of the sound beams displayed as modified by the user.

In order to efficiently draw the polygons and display the polygons on the screen 30 as shown in FIG. 3 and move them about the room as depicted in FIG. 3A in response to a user depressing the right or left cursor keys 83 on the remote control, the registers of the sound processor 18 are synchronized with the electronic key of the remote control. Process for controlling the synchronization of the sound processor registers with the key of the remote control includes translating the electronic key of the remote control into a two's complement number used directly in setting up and controlling the registers for each of the discrete channels in the sound processor. The keys are interpreted in real time such that when a user presses a left or right cursor key on the remote control, the bits from the electronic key of the remote control are converted into two's complement number which is then generated and sent to the sound processor 18 to synchronize the discrete channel.

The method for efficiently rendering polygons is based on the electronic key repeats of the remote control. Efficiently rendering multiple polygons on the screen 30 to simulate sound beam reflections requires the methods of flipping the pixel images to transparency and back to a specific color and location such that the polygon images appears to be a new pixel location with each iteration. Converting the image to transparency provides a clean base for the next iteration. The method for efficiently rendering polygons is effectively an internal iterator that is controlled by electronic key rate of the remote control. The faster the rate the faster the images are converted to transparency to provide a clean base for the next iteration and rendering.

Turning back to FIGS. 3 and 3A, the user can select the "custom" soft key 80 in the sound projection configuration menu 70 (FIG. 2), to view and adjust the approximate angles of the sound beams as represented by the graphical polygon traces 140. As depicted, a sound projector setup menu 100 is displayed on the screen 30 along with the image 130 of the TV viewing room containing graphical polygon traces 140. The sound projector setup menu 100 includes selectable menu options with current value settings indicated that correspond to the left beam angle 102, the right beam angle 104, the center beam angle 105, the left surround beam angle 106, and the right surround beam angle 108. The value of each beam angle can be adjusted by pressing the right or left cursor keys 83 on the remote control as indicated by menu key or guide 120. As the cursor keys 83 are pressed, the indicated angle value of the selected menu option will change as well as the angle and, thus, position of the corresponding polygon trace, the results of which are depicted in FIG. 3A, enabling the user to visually move the sound beams around the room to approximate locations.

In addition, the sound projector setup menu 100 includes selectable menu options with current value settings indicated that correspond to the sound level of left beam 110, the right beam 112, the center beam 114, the left surround beam 116, and the right surround beam 118. The level of each beam can also be adjusted by using the slider 122.

Figure 2A:
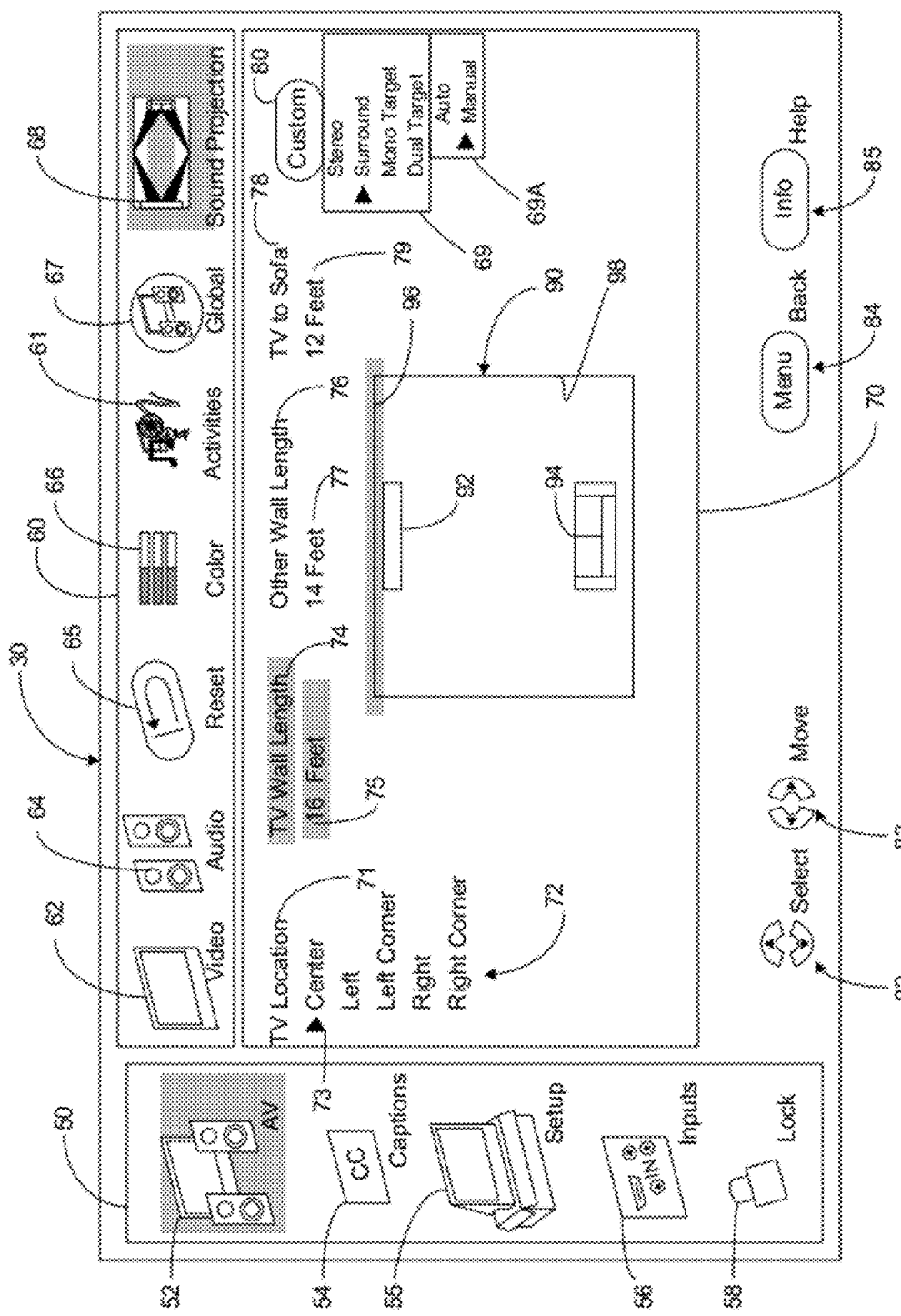
FIG. 2A depicts a graphical user interfaced based menu displayed on the screen of the television with the sound projector configuration menu and custom soft key drop down menu displayed.

As graphically depicted in FIGS. 3, 3A, 4, 5 and 6, the TV 10 with integral sound projector 40 can operate in a variety of audio modes including surround, stereo and single or multiple targeted beams. As depicted in FIG. 2A, when the "custom" soft key 80 is selected, an audio mode configuration drop down menu 69 or the like is displayed prompting the user to select an audio mode of operation to configure. Once an audio mode is selected, an auto/manual drop down menu 69A or the like is displayed prompting the user to select automatic or manual configuration of the selected audio mode of operation. If the "automatic" option is selected, the sound beam levels will automatically be calibrated as discussed below based on the current viewing room and beam parameter settings. If the "manual" option is selected, a sound projection custom setup menu and TV viewing room image will be displayed on the screen 30 prompting the user to adjust the beam angle and/or beam level as depicted in and discussed above with regard to FIG. 3.

Figure 2B:
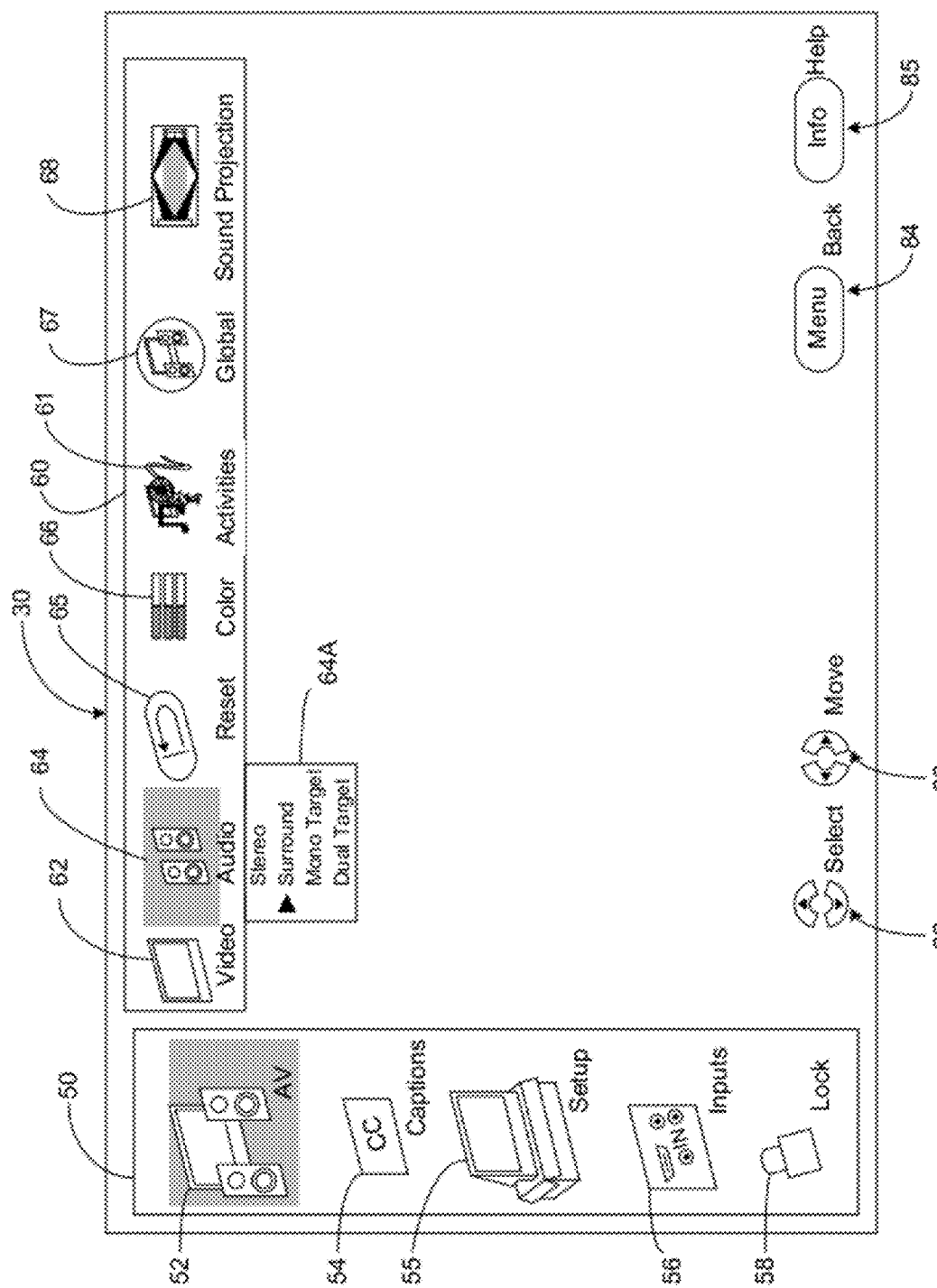
FIG. 2B depicts a graphical user interfaced based menu displayed on the screen of the television with the audio mode drop down menu displayed.

As depicted in FIG. 2B, the user can select an audio mode of operation by selecting the Audio icon 64 in AV device configuration menu 60. When Audio icon 64 is selected, an audio mode selection drop down menu 61 or the like is displayed prompting the user to select a desired audio mode of operation. Adjustment of the audio mode settings can be made by returning the sound projection configuration menu 70 and selecting the custom soft key 80.

Figure 4:
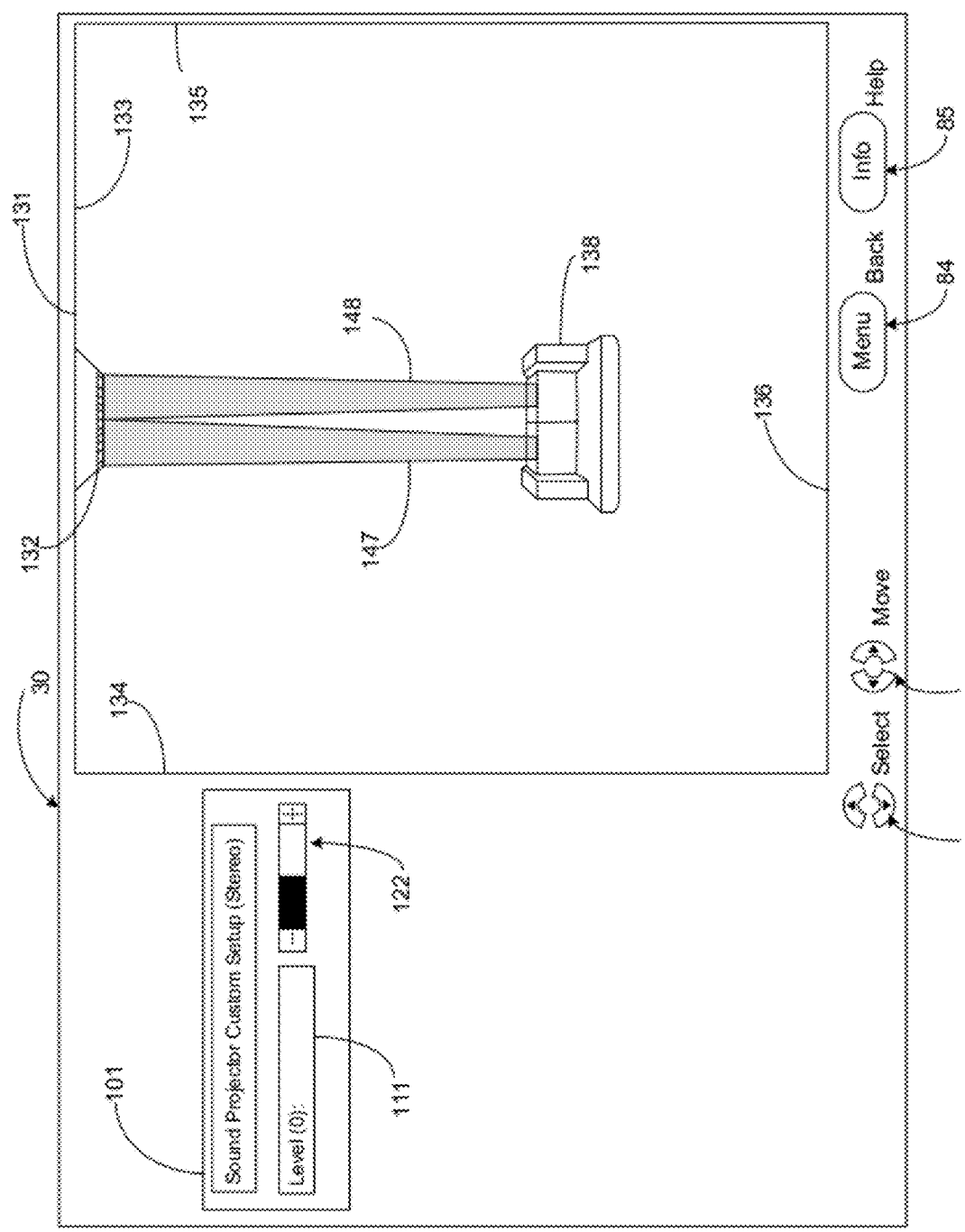
FIG. 4 depicts a graphical user interfaced based menu displayed on the screen of the television with the sound projector stereo mode custom setup menu displayed.

If the custom soft key 80 is selected and manual configuration of the stereo mode is selected from the audio mode configuration menus 69 and 69A, as depicted in FIG. 4, a sound projector custom setup menu 101 for stereo mode and a TV viewing room image 131 graphically depicting left and right stereo beams 147 and 148 emanating from the sound projector of the TV 132 are displayed on the screen 30. As depicted, the sound projector custom setup menu 101 preferably only includes a menu option corresponding to the sound level 111 of the beams 147 and 148, which can be adjusted with slide 122. Alternatively, the sound projector custom setup menu 101 can include a beam angle adjust menu option to adjust the angle of the stereo sound beams 147 and 148 to move beams around the room.

Figure 5:
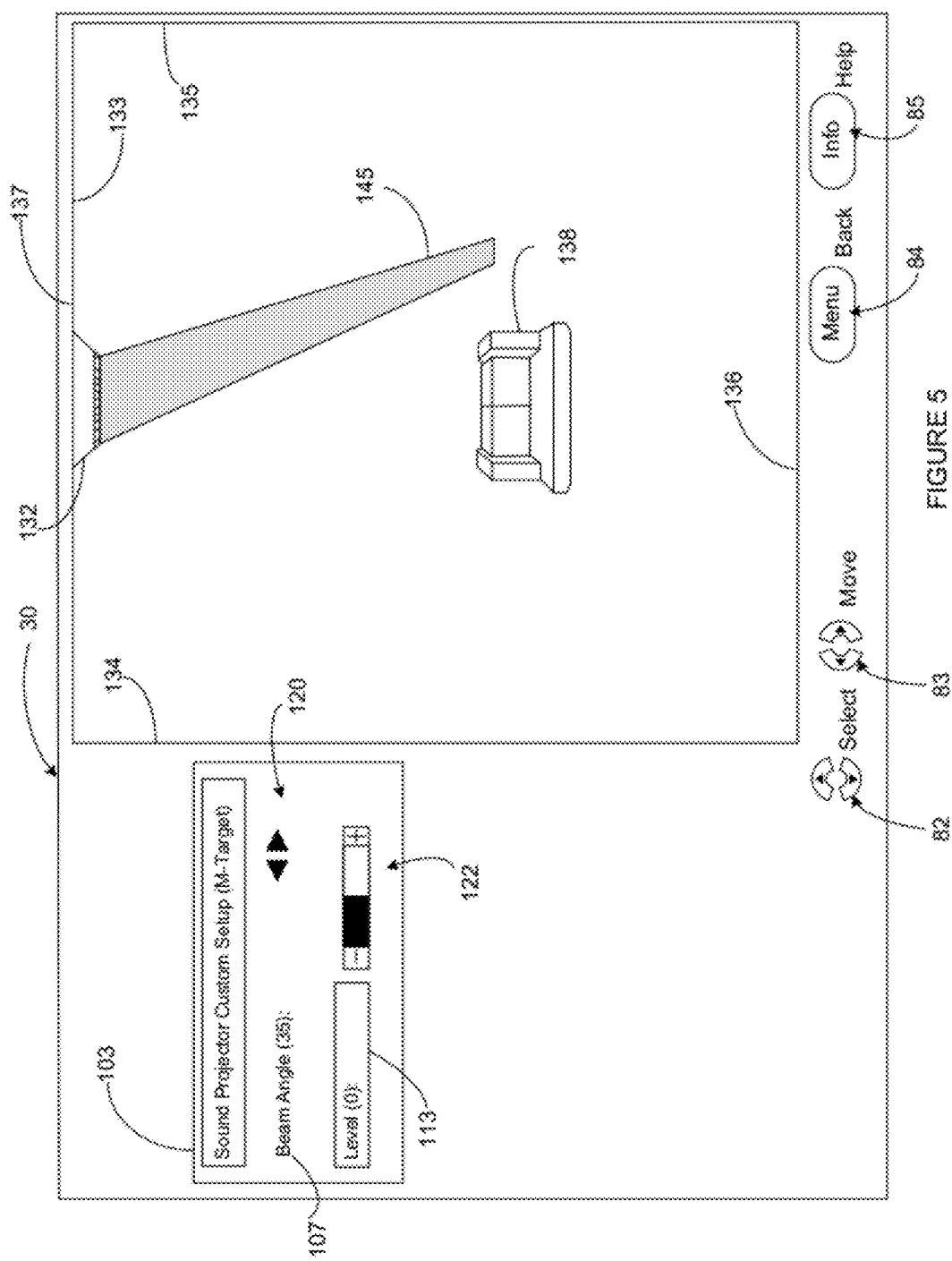
FIG. 5 depicts a graphical user interfaced based menu displayed on the screen of the television with the sound projector mono-target mode custom setup menu displayed.

If the custom soft key 80 is selected and manual configuration of the single or mono target beam mode is selected from the audio mode configuration menus 69 and 69A, as depicted in FIG. 5, a sound projector custom setup menu 103 and a TV viewing room image 137 graphically depicting a single or mono sound beam 145 emanating from the sound projector of the TV 132 are displayed on the screen 30. As depicted, the sound projector custom setup menu 103 preferably includes a menu option corresponding to a beam angle 107 of the mono beam. As indicated, the beam angle value can be adjusted to move the mono sound beam around the room to approximate targeted locations within the room. In addition, the sound projector custom setup menu 103 preferably includes a menu option corresponding to the sound level 113 of the mono beam, which can be adjusted with slide 122.

Figure 6:
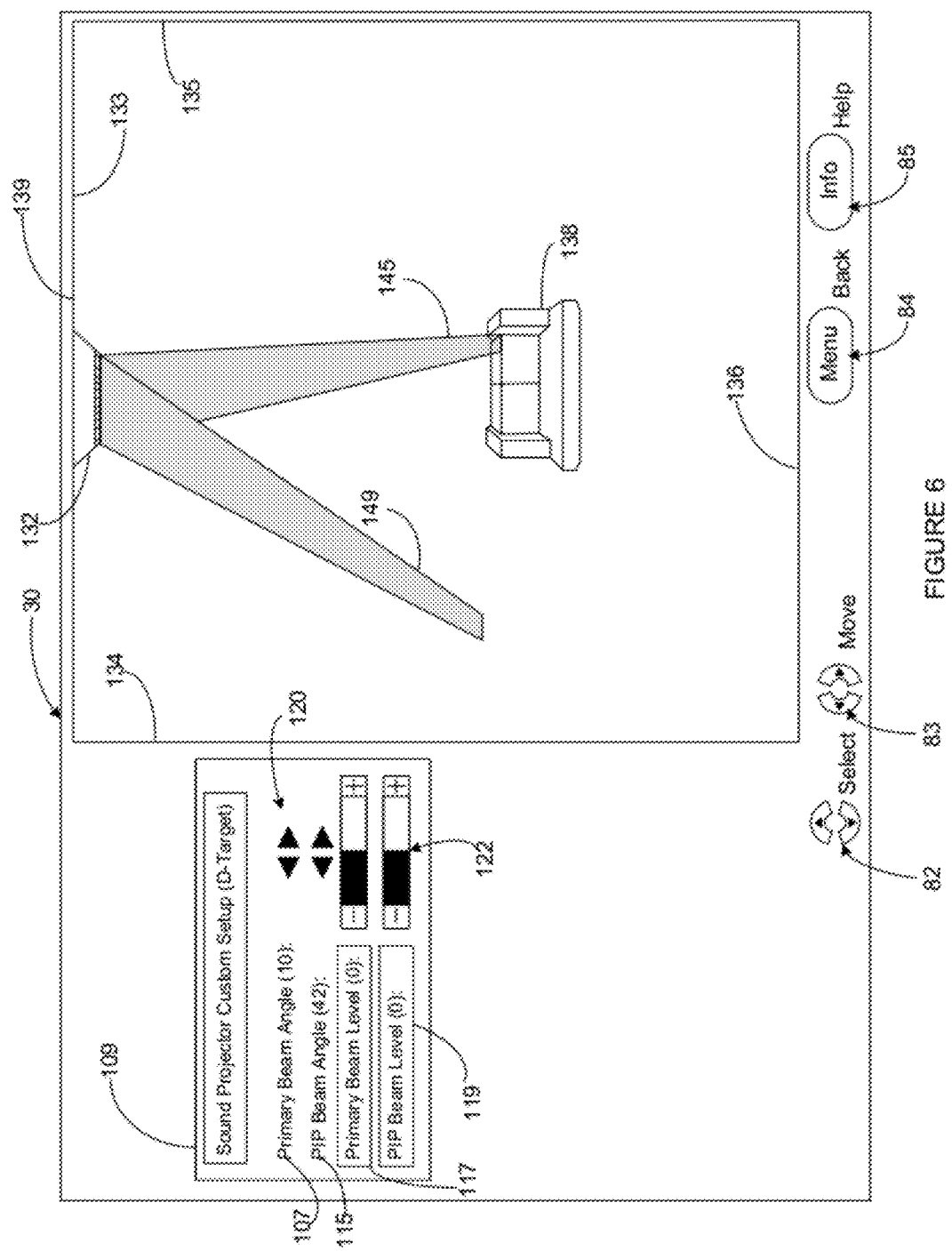
FIG. 6 depicts a graphical user interfaced based menu displayed on the screen of the television with the sound projector dual-target mode custom setup menu displayed.
Figure 7:
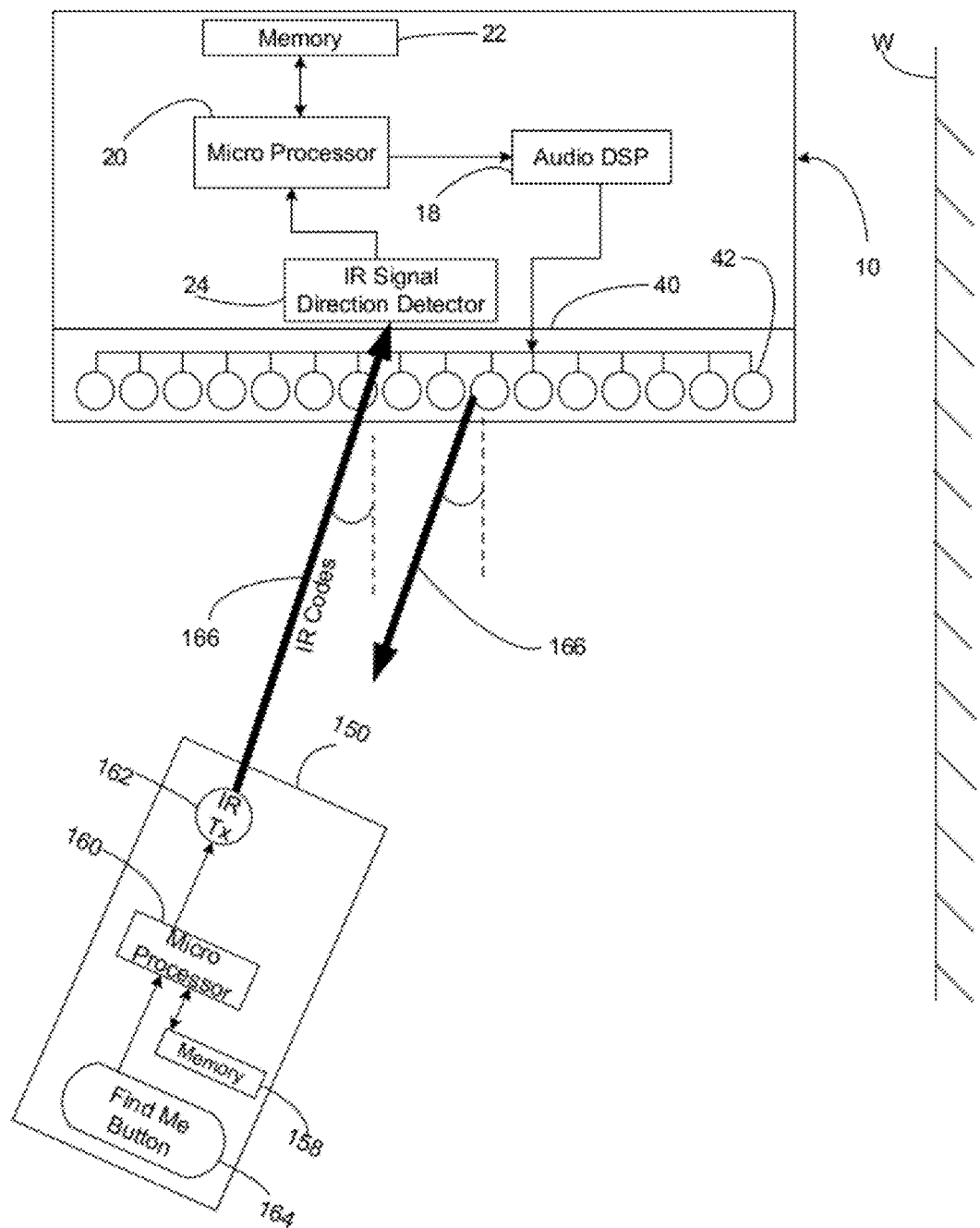
FIG. 7 depicts a schematic of a television with an integrated sound projector and control system including a IR signal direction detector circuit, and being capable of projecting the sound in the direction of the remote.

If the custom soft key 80 is selected and manual configuration of the dual target beam mode is selected from the audio mode configuration menus 69 and 69A, as depicted in FIG. 6, a sound projector custom setup menu 109 and a TV viewing room image 139 graphically depicting two or dual sound beams 145 and 149 emanating from the sound projector of the TV 132 are displayed on the screen 30. As depicted, the sound projector custom setup menu 109 preferably includes menu options corresponding to beam angles 107 and 115 of the two beams 145 and 149. As indicated, the beam angle value can be adjusted to move the two sound beams around the room to approximate targeted locations within the room. As suggested by the use of the term PIP in the menu, the dual beam mode can be used to allow two viewers to watch picture-in-picture or split screen video with the one beam or the primary sound beam 145 being assigned to the main picture or one of the pictures in the split screen and the other beam or PIP sound beam 149 being assigned to the PIP or other picture in the split screen.

In addition, the sound projector custom setup menu 109 preferably includes menu options corresponding to the sound levels 117 and 119 of the two beams, which can be adjusted with the slide 122.

As depicted in FIGS. 7 through 11, it may be desirable to automatically orient the screen and/or project sound toward the location of the remote control unit by pressing a single key, e.g., a "find me button", on the remote control unit. In one embodiment shown in FIGS. 7, 8A and 8B, the remote controller 150 preferably includes a micro processor 154, non-volatile memory 156 coupled to the micro processor 154, and an IR transmitter 152 coupled to the micro processor 154. Software to control and operate the remote controller 150 and comprising a set of instructions executable on the micro processor 154 is preferably stored in the memory 156. In addition, the remote controller 150 includes a dedicated function key such as a "find me" button 158 coupled to the micro processor 154, which when depressed the remote controller 150 sends to the TV 10 an IR signal or signals 170 comprising a series of instructions embedded therein that cause the control system 12 to enter a "find me" mode. The "find me" mode instruction signals 170 are followed by a direction signal or signals 171. While in the "find me" mode, the control system 12 is in a state of alert ready to receive and analyze the IR direction signals 171 wherein an IR signal direction detector circuit 23, which is coupled to the microprocessor 20, determines the angle θ relative to the plane of the screen of the TV that the IR signals or beams 170 are being directed towards the TV 10.

Figure 8A:
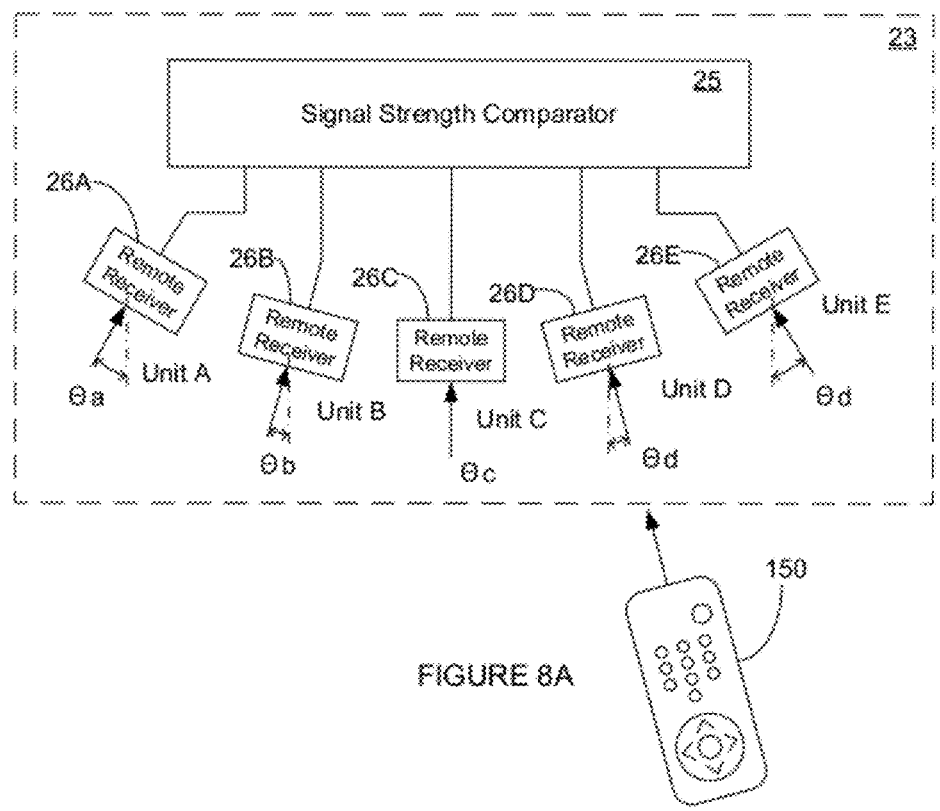
FIGS. 8A and 8B depict schematics the IR signal direction detector circuit.

As depicted in FIG. 8A, the IR signal direction detector circuit 23 includes N remote receiver units, i.e., units 26A, 26B, 26C, 26D and 26E as shown, coupled to a signal strength comparator 25. Each of the remote receiver units 26 is oriented at an angle θ horizontally from a normal ⊥ to the front of the television 10, i.e., remote receiver unit A 26A is oriented at an angle θa horizontally from the normal, remote receiver unit B 26B is oriented at an angle θb horizontally from the normal, remote receiver unit C 26C is oriented at an angle θc horizontally from the normal, remote receiver unit D 26D is oriented at an angle θd horizontally from the normal, and remote receiver unit E 26E is oriented at an angle θe horizontally from the normal. The signal strength comparator 25 receive a signal from each of the remote receiver units 26 and determines the angle θ from which the remote control unit 150 is pointing at the television 10.

Figure 8B:
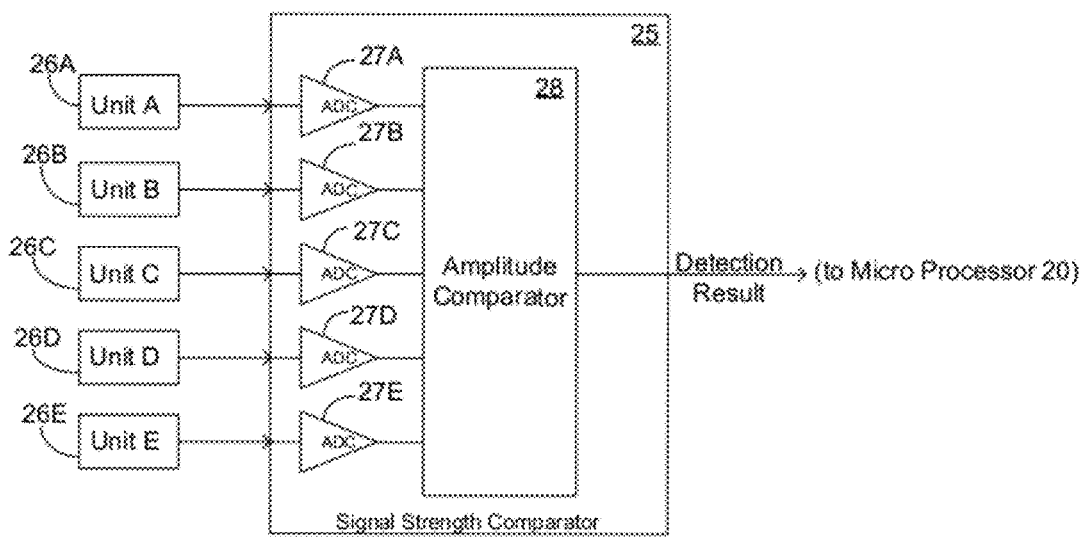

As depicted in FIG. 8B, the signal strength comparator 25 includes M analog-to-digital converters (ADC), i.e., ADCs 27A, 27B, 27C, 27D and 27E as shown, coupled to an amplitude comparator 28. The signal received by each of the remote receiver units 26A, 26B, 26C, 26D and 26E, which are each coupled to a different one of the ADCs 27A, 27B, 27C, 27D and 27E, is passed to the amplitude comparator 28, which detects which input signal received from the remote receiver units 26A, 26B, 26C, 26D and 26E has the largest amplitude. This detection information is passed along to the micro processor 20 of the control system 12.

The control system 12 uses this information to direct sound 180 from the sound projector 40 toward the remote controller 150. The control system 12 can then calculate and graphically show the sound beam or beams directed toward the remote controller 150 on the display screen as discussed and illustrated above.

As depicted in FIGS. 9A and 9B, the microprocessor 20 can use this information to orient the TV 10 so the screen is directed toward the remote controller 150. As depicted, the TV 10 is mounted on a motorized base 32 that rotates the TV 10 in response to commands from the microprocessor 20. Once the TV 10 is rotated, the control system 12 will recalculate the sound projection in accordance with the current selected sound mode and then graphically show the sound beam or beams directed toward the remote controller 150 on the display screen as discussed and illustrated above.

Figure 10:
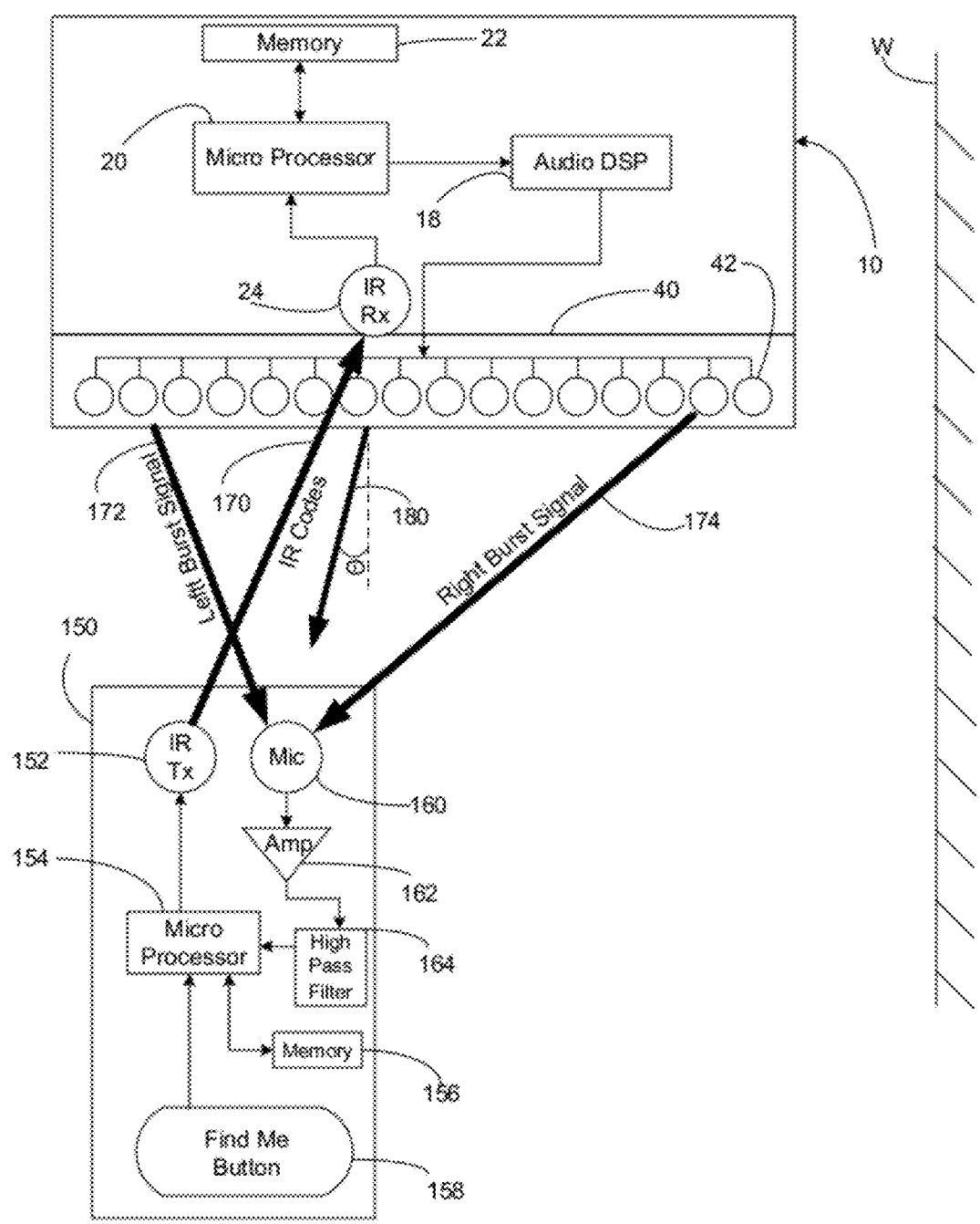
FIG. 10 depicts a schematic of a television with an integrated sound projector and control system, and a television remote control unit with an embedded microphone used to determine the location of the remote control unit.
Figure 11:
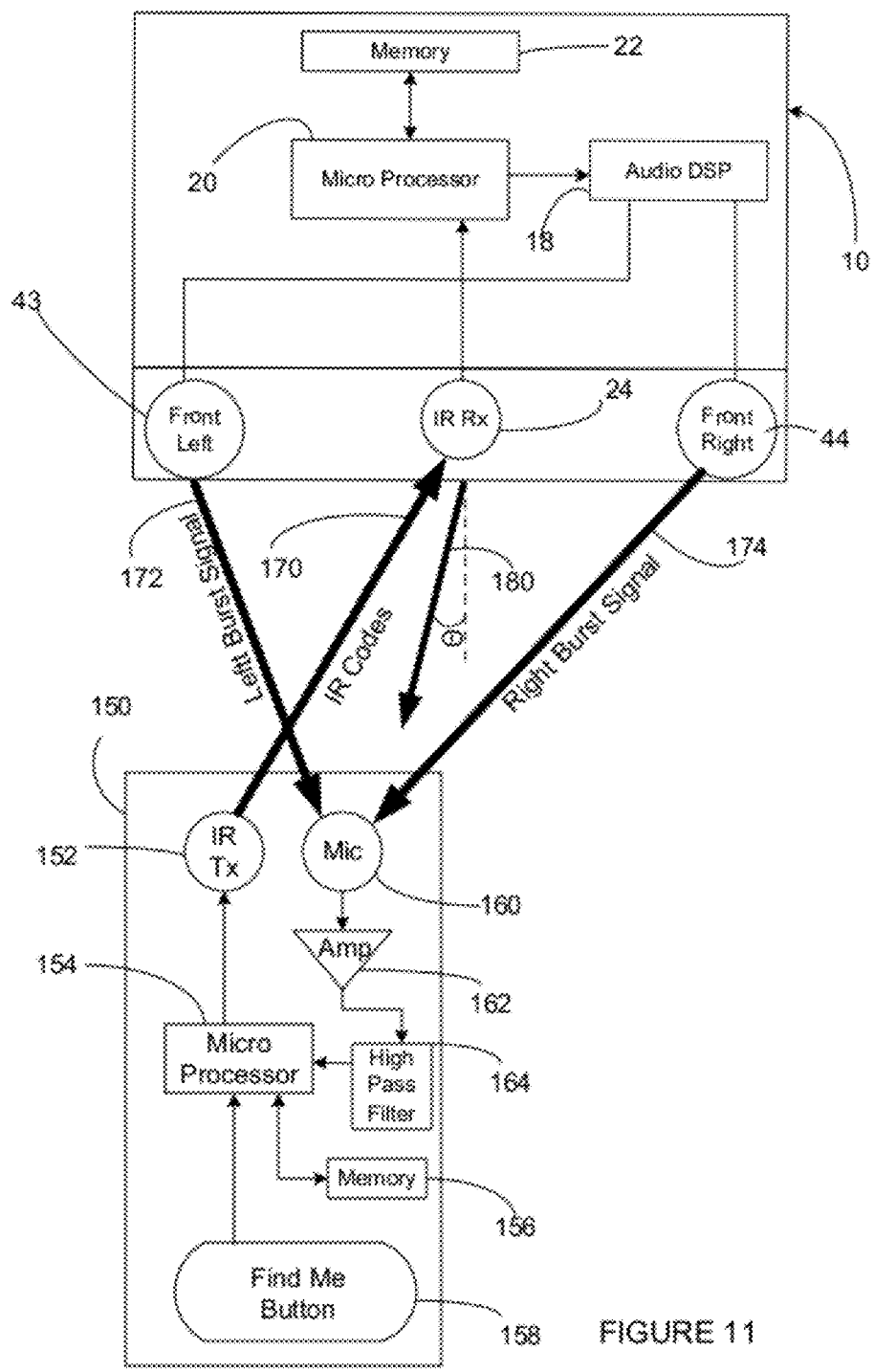
FIG. 11 depicts a schematic of a television with a control system and a television remote control unit with an embedded microphone used to determine the location of the remote control unit.

In an alternative embodiment, a television remote control unit 150 which, as depicted in FIGS. 10 and 11, is equipped with an embedded microphone 160 and microprocessor 154 to measure the distance of the remote controller 150 from the left and right speakers. When pressing the "find me" button 158 at step 202 of the "find me process 200 shown in FIG. 12, the remote controller 150 sends a "find me" command 170 to the TV 10 at step 204. This command 170 will put the TV microprocessor 120 in a state of alert being ready for very timing critical trigger events. The remote controller 150 will subsequently send a Left Burst Trigger command 170 to the TV 10 at step 206. The TV 10 will precisely output a high frequency (e.g. 10 KHz) burst 172 (see FIG. 13) in the left speaker or speaker component. The remote controller 150 will through a microphone 160 and high pass filter 164 detect the first peak of the received burst and measure the delta time. The remote controller 150 will subsequently send a Right Burst Trigger command 170 to the TV 10 at step 210. The TV 10 will precisely output a high frequency (e.g. 10 KHz) burst 172 at step 212 in the right speaker or speaker component. The remote controller 150 will through the microphone 160 and high pass filter 164 detect the first peak of the received burst and measure the delta time.

The remote controller 150 will, at step 214, return an IR code that includes delay for both left and right speakers. The TV 10 can use this information to determine the position of where the user is sitting and project sound and/or orient the TV screen towards where the user is sitting. The control system 12 can then calculate and graphically show the sound beam or beams directed toward the remote controller 150 on the display screen as discussed and illustrated above.

As one skilled in the art would readily recognize, this process can be used for the automatic setup of audio levels and delays in surround systems with TVs that serve the AVR function and include an integral surround sound decoder and either a sound projector, a power amplifier or wireless transmitters for discrete external speakers.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A television comprising
   a display screen,
   a sound projector,
   a control system coupled to the display screen and sound projector, wherein the control system is configured to cause the sound projector to project one or more sound beams into a room toward a target location as a function of the location of a remote control unit positioned within the room;
   wherein the interface prompts a user to input information using a menu-driven format; and
   wherein the interface prompts the user to input viewing room parameters.

2. The television of claim 1, wherein the control system is configured to display a graphical user interface on the screen, the graphical user interface including graphical representation of the projected path of the one or more sound beams and operable by a user to adjust the angles of the projected path of the one or more sound beams.

3. The television of claim 1, wherein the control system causes the output of sound in an output mode associated with a selected viewing activity.

4. The television of claim 1, wherein the menu-driven format includes one or more text entry areas and menu-driven choices.

5. The television of claim 1, wherein the viewing room parameters include a room size, a first wall size, a TV location on first wall, a second wall size, and a distance from the TV location to a sofa location.

6. The television of claim 1 further comprising a remote control unit and an IR signal direction detector circuit coupled to the control system.

7. A television comprising
   a display screen,
   a sound projector,
   a control system coupled to the display screen and sound projector, wherein the control system is configured to cause the sound projector to project one or more sound beams into a room toward a target location as a function of the location of a remote control unit positioned within the room;
   a remote control unit and an IR signal direction detector circuit coupled to the control system; and
   wherein the IR signal direction detector circuit is configured to determine the angle $\Theta$ relative to the plane of the screen of the television that the IR signals or beams are being directed towards the television from the remote control unit.

8. The television of claim 7, wherein the remote control unit comprises a control system, an IR transmitter coupled to the control system, and a dedicated function key coupled to the control system, wherein when the function key is depressed the remote control unit sends IR codes comprising a series of instructions embedded therein to the television to cause the control system of the television to enter a mode of operation to determine the angle $\Theta$ relative to the plane of the screen of the television that the IR signals or beams are being directed towards the television from the remote control unit.

9. The television of claim 8 wherein the IR signal direction detector circuit includes N remote receiver units, wherein each of the N remote receiver units is oriented in a horizontal plane at an angle $\Theta$ from a normal $\perp$ to the front of the television.

10. The television of claim 9 wherein the IR signal direction detector circuit further comprises a signal strength comparator coupled to each of the N remote receiver units, wherein the signal strength comparator is configured to receive a signal from each of the N remote receiver units and determines the angle $\Theta$ from which the remote control unit is pointing at the television.

11. The television of claim 10 wherein the includes M analog-to-digital converters (ADC) coupled to an amplitude comparator, wherein the amplitude comparator detects which input signal received from the remote receiver units has the largest amplitude.

12. The television of claim 7 wherein the control system is configured to orient the display screen at an angle directed toward a location as a function of the location of a remote control unit positioned within the room.

13. The television of claim 12, further comprising a motorized based coupled to the display screen and control system.

14. The television of claim 12, further comprising a motorized articulating mount coupled to the display screen and control system.

15. A television comprising
   a display screen,
   a sound projector,
   a control system coupled to the display screen and sound projector, wherein the control system is configured to cause the sound projector to project one or more sound beams into a room toward a target location as a function of the location of a remote control unit positioned within the room; and
   a remote control unit having a control system, an IR transmitter coupled to the control system, a microphone, a high pass filter coupled to the microphone and the control system, and a dedicated function key coupled to the control system, wherein when the function key is depressed the remote control unit sends IR codes comprising a series of instructions embedded therein to the television to cause the control system of the television to enter a mode of operation to determine the angle $\Theta$ relative to the plane of the screen of the television at which the remote control unit is located within the room relative to the television.

16. A method of directing sound from a television to a target location within a viewing room comprising the steps of
   receiving instructions from a remote control unit to determine an angle at which the remote control unit is located with a room relative to a television, and
   determining the angle at which the remote control unit is located within the room relative to the television;
   orienting the display screen of the television at an angle normal to the angle at which the remote control unit is located within the room relative to the television;
   wherein the step of determining the angle includes
   receiving a left burst trigger command from the remote control unit,
   transmitting a sound burst from a left speaker component of the television,
   detecting a first peak of the left sound burst at the remote control unit,
   determining the time delta between transmission of the left burst trigger command and the detection of the first peak of the left sound burst,
   receiving a right burst trigger command from the remote control unit,
   transmitting a sound burst from a right speaker component of the television, detecting a first peak of the right sound burst at the remote control unit, determining the time delta between transmission of the right burst trigger command and the detection of the first peak of the right sound burst, receiving an IR signal from the remote control unit that includes the delta for the left and right sound bursts, and calculating the angle at which the remote control unit is located within the room relative to the television as a function of the delta for the left and right sound bursts.

17. The method of claim 16 further comprising directing one or more sound beams along the angle at which the remote control unit is located within the room relative to the television.

18. A method of directing sound from a television to a target location within a viewing room comprising the steps of receiving instructions from a remote control unit to determine an angle at which the remote control unit is located with a room relative to a television, and determining the angle at which the remote control unit is located within the room relative to the television;

orienting the display screen of the television at an angle normal to the angle at which the remote control unit is located within the room relative to the television;

wherein the step of determining the angle includes receiving an IR direction signal from the remote control unit at N remote receiver units, wherein each of the N remote receiver units is oriented in a horizontal plane at an angle $\ominus$ from a normal $\perp$ to the front of the television, determining which of the N received IR direction signals has the largest amplitude, and determining the angle at which the remote control unit is located within the room relative to the television as corresponding to the angle at which the remote receiver unit receiving the IR direction signal with the largest amplitude is oriented in a horizontal plane at an angle $\ominus$ from a normal $\perp$ to the front of the television.

* * * * *